US010841895B2

(12) United States Patent
Inoko et al.

(10) Patent No.: US 10,841,895 B2
(45) Date of Patent: Nov. 17, 2020

(54) TERMINAL DEVICE FOR POSITION MEASUREMENT, COMPUTER PROGRAM, AND SYSTEM

(71) Applicant: TEAMLAB INC., Tokyo (JP)

(72) Inventors: Toshiyuki Inoko, Tokyo (JP); Wataru Sakashita, Tokyo (JP)

(73) Assignee: TeamLab Inc., Tokyo (JP)

(*) Notice: Subject to any disclaimer, the term of this patent is extended or adjusted under 35 U.S.C. 154(b) by 0 days.

(21) Appl. No.: 16/618,399

(22) PCT Filed: May 29, 2018

(86) PCT No.: PCT/JP2018/020558
§ 371 (c)(1),
(2) Date: Dec. 2, 2019

(87) PCT Pub. No.: WO2018/221515
PCT Pub. Date: Dec. 6, 2018

(65) Prior Publication Data
US 2020/0296684 A1    Sep. 17, 2020

(30) Foreign Application Priority Data

Jun. 2, 2017 (JP) ................................. 2017-110494

(51) Int. Cl.
*H04W 64/00* (2009.01)
*H04W 4/029* (2018.01)
(Continued)

(52) U.S. Cl.
CPC ............. *H04W 64/006* (2013.01); *G01S 5/14* (2013.01); *H04W 4/029* (2018.02); *H04W 4/80* (2018.02)

(58) Field of Classification Search
CPC ..... H04W 64/006; H04W 4/029; H04W 4/80; H04W 64/00; H04W 4/02; G01S 5/14; H04M 1/00; G06K 17/00
See application file for complete search history.

(56) References Cited

U.S. PATENT DOCUMENTS

| 2008/0004798 A1* | 1/2008 | Troxler | ................ G01N 23/00 |
| | | | 702/187 |
| 2013/0029685 A1* | 1/2013 | Moshfeghi | .............. G01S 19/48 |
| | | | 455/456.1 |

(Continued)

FOREIGN PATENT DOCUMENTS

| JP | 2010-531973 A | 9/2010 |
| JP | 2012-229957 A | 11/2012 |

(Continued)

OTHER PUBLICATIONS

International Search Report of International Patent Application No. PCT/JP2018/020558 completed Jul. 31, 2018 and dated Aug. 14, 2018 (2 pages).

(Continued)

*Primary Examiner* — Nathan S Taylor
(74) *Attorney, Agent, or Firm* — Pyprus Pte Ltd (57) ABSTRACT

To efficiently measure the positional relationship between a host terminal and a wireless tag in a terminal device. A terminal device 30: measures a first distance between a plurality of base stations 20 provided at individual reference positions and host terminal on the basis of wireless signals emitted by the base stations 20; specifies the position of the host terminal on the basis of the first distance; and specifies the position of a wireless tag 10 on the basis of information pertaining to a second distance between the wireless tag 10 and the base stations 20, said information being transmitted (Continued)

by base stations 20 that have received a wireless signal emitted by the wireless tag 10.

5 Claims, 6 Drawing Sheets

(51) Int. Cl.
*G01S 5/14* (2006.01)
*H04W 4/80* (2018.01)

(56) References Cited

U.S. PATENT DOCUMENTS

| | | | | |
|---|---|---|---|---|
| 2013/0051616 | A1* | 2/2013 | Makino | G06K 9/3216 |
| | | | | 382/103 |
| 2013/0076568 | A1* | 3/2013 | Shoarinejad | G01C 21/00 |
| | | | | 342/463 |
| 2016/0014558 | A1* | 1/2016 | Berlin | G06Q 10/08 |
| | | | | 235/385 |
| 2016/0112839 | A1* | 4/2016 | Choi | H04W 8/005 |
| | | | | 455/41.2 |
| 2016/0316317 | A1* | 10/2016 | Mayiras | H04W 4/80 |
| 2017/0064647 | A1* | 3/2017 | Debates | G06K 7/10217 |
| 2019/0090095 | A1* | 3/2019 | Lim | G10L 15/22 |
| 2019/0294166 | A1* | 9/2019 | Hill | G01S 5/0284 |

FOREIGN PATENT DOCUMENTS

| | | |
|---|---|---|
| JP | 2013-050882 A | 3/2013 |
| JP | 2015-096809 A | 5/2015 |
| TW | 201704772 A | 2/2017 |
| WO | WO-2008048059 A1 * 4/2008 | H04B 7/2606 |

OTHER PUBLICATIONS

Written Opinion of International Patent Application No. PCT/JP2018/020558 completed Jul. 31, 2018 and dated Aug. 14, 2018 (4 pages).
Office Action of corresponding Taiwan application No. 107118670 dated Apr. 12, 2019 (9 pages).

* cited by examiner

TERMINAL DEVICE FOR POSITION MEASUREMENT, COMPUTER PROGRAM, AND SYSTEM

TECHNICAL FIELD

The present invention relates to a terminal device that can obtain a positional relationship with a wireless tag, and its computer program. Further, the present invention relates to a position measurement system including the terminal device, the wireless tag, and a base station.

BACKGROUND ART

Conventionally, there has been known a position measurement technique where wireless signals, such as beacons, sent from a plurality of base stations are received by a terminal device, the terminal device measures a received intensity of the wireless signal to obtain distances between the respective base stations and the terminal device, and using a triangulation method and the like specifies a position of the terminal device. Using such a position measurement technique ensures specifying the position of the terminal device without using, for example, a Global Positioning System (GPS), and thus the position of the terminal device can be accurately obtained even inside a room where it is difficult to receive a GPS satellite signal, and in a shading region. Further, it is advantageous that the terminal device itself does not need to include a network communication device.

For example, Patent Document 1 discloses a position measurement system of a radio frequency identification reader, using a beacon. This system includes a plurality of beacon devices, a radio frequency identification tag, and a radio frequency identification reader, emits beacons from the respective beacon devices, and transmits already-stored information from the radio frequency identification tag to the radio frequency identification reader using radio frequency identification. When the radio frequency identification reader receives the plurality of pieces of beacons from the plurality of pieces of beacon devices during a movement, the radio frequency identification reader calculates a current position using the respective beacons, and receives the information from the radio frequency identification tag using the radio frequency identification. This ensures measuring the position of the radio frequency identification reader during a movement and further ensures the increased accuracy of the position measurement.

Patent Document 1: JP-T-2010-531973

DISCLOSURE OF THE INVENTION

Problems to be Solved by the Invention

Incidentally, while, in the conventional position measurement technique, the terminal device (radio frequency identification reader) can measure a relative positional relationship with the base station (beacon device) to obtain a position of a host terminal, the terminal device cannot obtain a positional relationship between the host terminal, and the other device and the like. Especially, in a state where the wireless tag that emits a wireless signal is positioned at a proximity of the terminal device, when the terminal device can accurately measure not only the position of the host terminal but also a position of this wireless tag, it is effective in various situations. However, in the conventional position measurement technique, the terminal device cannot measure the position of the wireless tag.

Then, an object of the present invention is to provide a technique where a terminal device can efficiently measure a positional relationship between a host terminal and a wireless tag.

Solutions to the Problems

The inventors of the present invention seriously examined solutions of the above-described problem and thus obtained a knowledge that a mobile terminal specifies a position of a host terminal on the basis of wireless signals emitted from a plurality of base stations, receives information pertaining to distances between the base stations and the wireless tag from the base stations to specify a position of this wireless tag, and these can obtain a positional relationship between the host terminal and the wireless tag without using a GPS and the like. Then, the inventors achieved solving the problem of prior art on the basis of the above-described knowledge and made the present invention. Specifically describing, the present invention has the following configurations.

A first aspect of the present invention relates to a terminal device. The terminal device includes a between-base-station-distance measurement unit, a host terminal position specifying unit, and a tag position specifying unit. The between-base-station-distance measurement unit measures a first distance between a plurality of base stations provided at individual reference positions and the host terminal on the basis of wireless signals emitted by the base stations. The host terminal position specifying unit specifies a position of the host terminal on the basis of the first distance obtained as described above. The tag position specifying unit specifies a position of the wireless tag on the basis of at least information pertaining to a second distance between the base stations and the wireless tag. The information is transmitted by the base stations that have received a wireless signal emitted by the wireless tag.

The present invention includes various utilization configurations. For example, the present invention can be used for an animal observation. Specifically describing, when the wireless tag is mounted to an animal (object) as an observation target, a position of the animal can be instantly confirmed on the terminal device. For example, mounting the wireless tag to a possession ensures confirming a position of this lost property on the terminal device when the terminal device is in a range where the terminal device can receive the wireless signal from the wireless tag, even when it is lost. For example, when a pedestrian carries the wireless tag, a vehicle includes the terminal device, and the base stations are disposed around an intersection and a traffic light, a position of the pedestrian can be confirmed on the terminal device of the vehicle, and thus it can be used for avoiding a collision between the pedestrian and the vehicle. Note that the present invention is not limited to these utilization configurations and applicable to various goods and services.

In the present invention, it is preferred that the terminal device further include a between-tag-distance measurement unit. The between-tag-distance measurement unit measures a third distance between the wireless tag and the host terminal on the basis of the wireless signal emitted by the wireless tag. Receiving the wireless signal from the wireless tag by the terminal device ensures obtaining a positional relationship between the host terminal and the wireless tag with higher accuracy.

In the present invention, it is preferred that the wireless signal emitted by the wireless tag include identification information unique to an object to which the wireless tag is mounted. It is preferred that the terminal device further include a photographing unit and a photographing target estimator. The photographing target estimator estimates that photographing of the object to which the wireless tag is mounted has succeeded when the terminal is within a predetermined distance range from the wireless tag at a time of photographing by the photographing unit. This embodiment is especially effective for an observation of a moving object (such as an animal). That is, when photographing near the object has been performed by the terminal device, it can be estimated that photographing this object has been performed. While, ordinarily, the photographed image needs to be analyzed to determine whether the object is included within this image, according to the above-described embodiment, such processing in the terminal device can be omitted.

In the present invention, the terminal device may further include a photographing direction specifying unit that specifies a photographing direction by the photographing unit. In this case, the photographing target estimator can also estimate that photographing of the object to which the wireless tag is mounted has succeeded when the photographing direction by the photographing unit matches an existence direction of the wireless tag. For example, the photographing target estimator may estimate that photographing of the object to which the wireless tag is mounted has succeeded when the terminal is within a predetermined distance range from the wireless tag at a time of photographing, and the photographing direction by the photographing unit matches the existence direction of the wireless tag.

A second aspect of the present invention relates to a computer program. The computer program according to the present invention causes a portable information terminal, such as a smart phone, to function as the terminal device according to the above-described first aspect. The computer program can be preliminarily installed to the portable information terminal and can also be downloaded to the portable information terminal through the Internet.

A third aspect of the present invention relates to a position measurement system. The system according to the present invention includes a terminal device, a wireless tag, and a plurality of base stations provided at individual reference positions. The base station measures a second distance between the wireless tag and a host base station on the basis of a wireless signal emitted by the wireless tag and transmits information pertaining to the second distance to the terminal device. The terminal device measures a first distance between the base stations and a host terminal on the basis of wireless signals emitted by the base stations, specifies a position of the host terminal on the basis of the first distance, and specifies a position of the wireless tag on the basis of at least information pertaining to the second distance.

Effects of the Invention

According to the present invention, the terminal device can efficiently measure the positional relationship between the host terminal and the wireless tag.

DESCRIPTION OF PREFERRED EMBODIMENTS

The following describes a configuration to execute the present invention using the drawings. The present invention is not limited to the configuration described in the following and also includes a configuration appropriately changed within a range where it is obvious for those skilled in the art from the following configuration.

Figure 1:
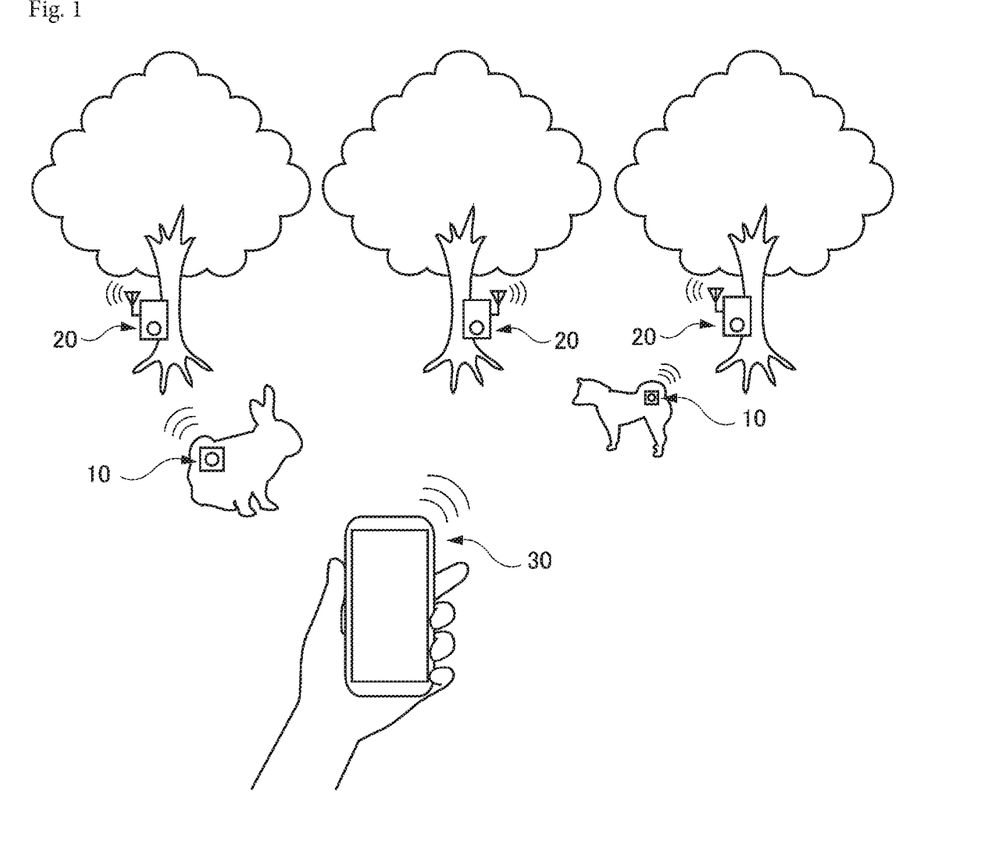
FIG. 1 is a conceptual diagram illustrating an embodiment of a position measurement system.
Figure 2:
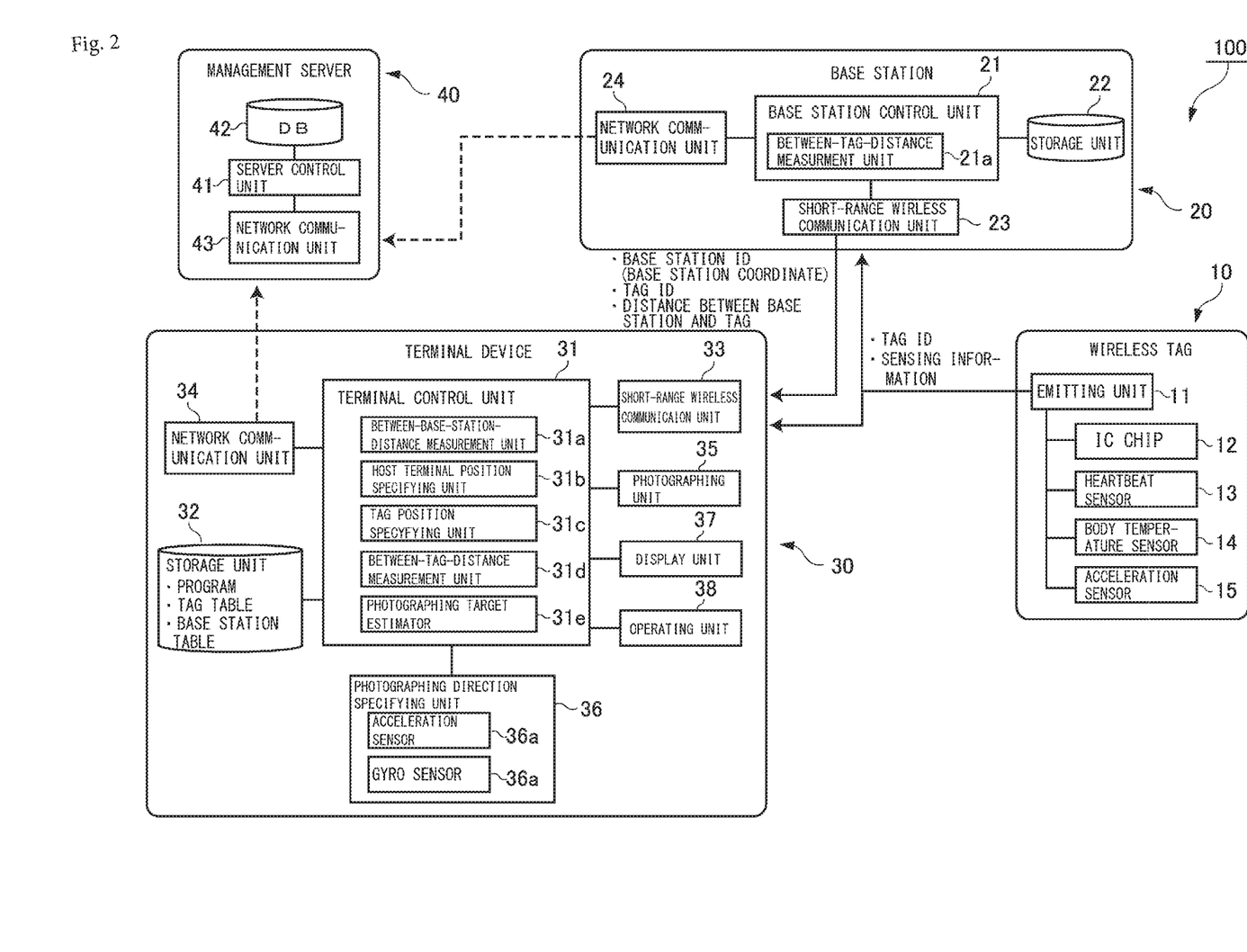
FIG. 2 is a block diagram illustrating a functional composition of various units that constitute the position measurement system.

FIG. 1 illustrates an embodiment of a position measurement system 100 according to the present invention. FIG. 2 illustrates a functional composition of various units that constitute the position measurement system. As illustrated in FIG. 1 and FIG. 2, the position measurement system 100 according to this embodiment includes wireless tags 10, base stations 20, a terminal device 30, and a management server 40. Note that the management server 40 is not an essential component and thus can be omitted.

As illustrated in FIG. 1, in this embodiment, the position measurement system 100 is used for an animal management. Specifically describing, the wireless tag 10 is mounted to an animal as an observed object. A plurality of base stations 20 are located within an area where the animal is reared, and can be mounted to for example, a tree and the like. The terminal device 30 is owned by a user of this system. The respective base stations 20 are provided at reference positions, and positional information (position coordinates) of these reference positions are already known.

After the terminal device 30 receives wireless signals, such as a beacon, sent from the respective base stations 20 and obtains its received intensity to measure distances from the respective base stations 20, the terminal device 30 specifies its own positional information using a triangulation method and the like. Further, the respective base stations 20 receive wireless signals, such as a beacon, sent from the wireless tag 10 and obtains its received intensity to obtain a distance from the wireless tag 10. A distance between the base station 20 and the wireless tag 10 is conveyed from the respective base stations 20 to the terminal device 30. The terminal device 30 uses information pertaining to the distance between the base station 20 and the wireless tag 10 or, in addition to this, uses information pertaining to a distance between a host terminal and the wireless tag 10 to specify a position of the wireless tag 10. Thus, on, for example, a display unit of the terminal device 30, a positional relationship between the host terminal and the wireless tag 10, specifically, a distance to the wireless tag 10, a direction where the wireless tag 10 exists can be shown. The following describes compositions of respective units of the position measurement system 100 in detail.

The wireless tag 10 is an electronic device that is mounted to an object having a position to be specified. The wireless tag 10 is achieved by a wireless signal emitter, such as Bluetooth (registered trademark), and a Radio Frequency IDentification (RFID) and executes exchanging between the base stations 20 and the terminal device 30 through a contactless-type short-range wireless communication using an electromagnetic field, a radio wave, and the like. The present invention can employ, for example, a passive type or a semi-passive type circuit, or a circuit having the structure based on these as a circuit of the wireless tag 10.

The wireless tag 10 basically includes an emitting unit 11 and an IC chip 12. The IC chip 12 includes a storage unit that stores ID information (tag ID) unique to the wireless tag 10 or the object to which it is mounted, and emits a wireless signal including this tag ID via the emitting unit 11. For example, the passive type wireless tag 10 receives a radio wave emitted from the base station 20 and the terminal device 30 to convert the received radio wave into an electromotive force using a coil of an antenna and a schottky diode, and this electromotive force activates the IC chip 12. When the IC chip 12 is activated, the IC chip 12 reads the unique tag ID held in the storage unit and emits the unique tag ID, which is read from the storage unit, to the base station 20 and the terminal device 30 via the emitting unit 11. The passive type wireless tag 10 converts a radio wave into an electromotive force to operate, and thus it is advantageous that the passive type wireless tag 10 does not need a power supply (for example, a battery), is produced at low-price, and can be almost permanently used. Further, the semi-passive type wireless tag 10 also can be used. The semi-passive type wireless tag 10 receives the radio wave emitted from the base station 20 and the terminal device 30 and takes this as an opportunity to operate the inside power supply. Then, using the electric power obtained from the power supply activates the IC chip 12 to emit the unique tag ID, which is stored in the storage unit, to the base station 20 and the terminal device 30. The wireless signal sent from the wireless tag 10 can reach around, for example, a radius of 1 m to 10 m, and a reach range of this wireless signal is appropriately adjustable. The short-range wireless communications between the wireless tag 10, the base stations 20 and the terminal device 30 may be executed in accordance with a known standard, such as Bluetooth (registered trademark).

The wireless tag 10 may include a biological sensor for sensing a biological signal, such as a heartbeat sensor 12 and a body temperature sensor 13, and an action sensor for sensing action information of the object, such as an acceleration sensor 14. The heartbeat sensor 12 measures a heart rate of an animal to which the wireless tag 10 is mounted, and the body temperature sensor measures a body temperature of this animal. The acceleration sensor 13 measures an acceleration when the animal to which the wireless tag 10 is mounted moves. Sensing information obtained by these various sensors 11 to 13 is emitted to the base station 20 and the terminal device 30 along with the ID information (tag ID) unique to the wireless tag via the emitting unit 11.

The base station 20 is located at the reference position having the known position coordinate. For example, each of the base stations 20 includes a base station control unit 21, a storage unit 22, and a short-range wireless communication unit 23. The base station control unit 21 includes a processor, such as a CPU, and controls the other components 22 to 24. The storage unit 22 stores at least ID information (base station ID) unique to the base station. The storage unit 22 may store coordinate information at which the base station 20 is located. The base station control unit 22 reads the base station ID from the storage unit 22 to convey this base station ID to the terminal device 30 through the short-range wireless communication unit 23. The base station control unit 22 can also convey the positional information (coordinate information) of the base station 20 to the terminal device 30 through the short-range wireless communication unit 23. The short-range wireless communication unit 23 receives the wireless signal from the wireless tag 10 in accordance with a known standard, such as Bluetooth (registered trademark), and emits predetermined information to the terminal device 30.

The base station control unit 21 includes a between-tag-distance measurement unit 21a. When the wireless signal is received from the wireless tag 10, the between-tag-distance measurement unit 21a measures a distance between this wireless tag 10 and a host base station. It is only necessary that the between-tag-distance measurement unit 21a measures, for example, the received intensity of the wireless signal received from the wireless tag 10 to obtain the distance from this wireless tag 10 on the basis of this received intensity. The information pertaining to the distance between the wireless tag 10 and the base station 20 is transmitted to the terminal device 30 along with the tag ID of this wireless tag 10 and the base station ID of this base station 20 through the short-range wireless communication unit 23. This allows the terminal device 30 to identify which wireless tag 10 and base station 20 succeed in the communication and to obtain the distance between the wireless tag 10 and the base station 20 that are executing the communication.

The base station 20 may include a network communication unit 24. Via the network communication unit 24, the base station 20 can transmit a date and time and a communication period of communicating with the wireless tag 10, and the information pertaining to the distance obtained by the between-tag-distance measurement unit 21a to the management server 40 via the Internet. When the sensing information sent by the wireless tag 10 is received, the base station 20 can transmit this sensing information to the management server 40. The management server 40 registers the various information received from the base station 20 in a database to manage an action history and biological information of the animal to which the wireless tag 10 is mounted, and the like. For example, when the action history and the biological information of the animal is abnormal, an injury and a disease may occur. Thus, managing and analyzing these pieces of information in the management server 40 facilitates executing a treatment and the like after such an animal is captured. Therefore, even when the wireless tag 10 itself does not include a device to be connected to the Internet, the management server 40 on the Internet can be provided with the various effective sensing information obtained by the wireless tag 10 via the base station 20.

The terminal device 30 is a portable information terminal owned by the user of this system. The user can know the positional relationship between the host terminal and the wireless tag 10 through the terminal device 30. The terminal device 30 includes a terminal control unit 31, a storage unit 32, a short-range wireless communication unit 33, a network communication unit 34, a photographing unit 35, a photographing direction specifying unit 36, a display unit 36, and an operating unit 37. FIG. 2 illustrates an example of a common functional composition as a functional composition of the terminal device 30. In this system, a plurality of devices of terminal devices 30 may exist. It is not necessary that all of the respective terminal devices 30 have an identical composition, and the respective terminal devices 30 may have different compositions.

The terminal control unit 31 performs an arithmetic process that controls the other components 32 to 38, which are included in the terminal device 30. As the terminal control unit 31, a processor, such as a CPU or a GPU, can be used. The terminal control unit 31 reads an application program (computer program) stored in the storage unit 32 to control the other components in accordance with this application program. Further, the terminal control unit 31 can appropriately write and read an arithmetic result following the application program in the storage unit 32.

The storage unit 32 of the terminal device 30 is a component to store information used for the arithmetic process and the like in the terminal control unit 11. Specifically describing, the storage unit 32 stores an application program that causes a general-purpose portable information communication terminal to function as the terminal device 30 according to the present invention. This application program may be a downloaded one to the terminal device 30 via the Internet and may be a preinstalled one in the terminal device 30. Further, the storage unit 32 may also store another program other than the application program for this system. When an instruction from the user activates the application program, a process following this program is performed. A storage function of the storage unit 32 can be achieved by a non-volatile memory, such as an HDD and an SDD. Further, the storage unit 32 may have a function as a memory to write or read an interim progress of the arithmetic process by the terminal control unit 11, and the like. A memory function of the storage unit 32 can be achieved by a volatile memory, such as a RAM and a DRAM.

The storage unit 32 of the terminal device 30 includes a tag table where the tag ID unique to the wireless tag 10 is associated with information pertaining to the object (for example, an animal) to which it is mounted. For example, in the tag table, taking the tag ID as a key item, information, such as the ID information unique to the object to which the wireless tag 10 is mounted, and a type, a name, an age, and an icon image of the object, is stored. Thus, when the terminal device 30 can receive the tag ID from the wireless tag 10 and the base station 20, the terminal device 30 reads various information associated with this tag ID from the tag table to ensure specifying the object to which this wireless tag 10 is mounted.

Further, the storage unit 32 of the terminal device 30 includes a base station table where the base station ID unique to the base station 20 is associated with positional information of this base station 20. For example, in the base station table, taking the base station ID as a key item, coordinate information of the base station is stored. The coordinate information of the base station may be preliminarily stored in the base station table of the terminal device 30 or may be transmitted from the base station 20 to the terminal device 30 when a communication between the terminal device 30 and the base station 20 succeeds. When the terminal device 30 can receive the base station ID from the base station 20, the terminal device 30 reads the coordinate information of the base station associated with this base station ID from the base station table to ensure specifying a position of this base station 20. When the base station 20 is mounted to a specific object, in the base station table, information pertaining to this object can be also stored.

The short-range wireless communication unit 32 of the terminal device 30 receives a wireless signal, such as a beacon, from the wireless tag 10 and the base station 20 in accordance with a known standard, such as Bluetooth (registered trademark). The wireless signal emitted from the wireless tag 10 includes at least the tag ID unique to the wireless tag 10. Further, the wireless signal of the wireless tag 10 may include the sensing information, which has been obtained by the various sensors 12 to 15. The wireless signal emitted from the base station 20 includes the base station ID unique to the base station 20, the tag ID of the wireless tag 10 that has executed the communication with this base station 20, and the information pertaining to the distance between the base station 20 and the wireless tag 10, which has been measured by the between-tag-distance measurement unit 21a of the base station 20. Further, the wireless signal of the base station 20 may include the coordinate information of this base station 20. The short-range wireless communication unit 32 of the terminal device 30 can receive these pieces of information from the wireless tag 10 and the base station 20.

The network communication unit 34 of the terminal device 30 can transmit a date and time and a communication period of communicating with the wireless tag 10 or the base station 20, and the arithmetic result (for example, information pertaining to a position of the host terminal and a position of the wireless tag, information pertaining to the object where photographing has succeeded, and the like) in the terminal control unit 31 to the management server 40 via the Internet. Further, when the terminal device 30 receives the sensing information sent by the wireless tag 10, the terminal device 30 can transmit this sensing information to the management server 40. The management server 40 registers the various information received from the terminal device 30 in the database to manage an action history of the user, which owns the terminal device 30, the action history and the biological information of the animal to which the wireless tag 10 is mounted, and the like.

The photographing unit 35 is a camera to obtain image data of a still image or a moving image. As the camera, which constitutes the photographing unit 35, a camera incorporated in the terminal device 30 is used. The image data, which has been obtained by the photographing unit 35, is delivered to the terminal control unit 31 and is saved in the storage unit 32 after a predetermined arithmetic process is performed. The camera is achieved by, for example: a lens; a mechanical shutter; a shutter driver; a photoelectric conversion element, such as a CCD image sensor unit and a CMOS image sensor unit; a digital signal processor (DSP) that reads an electric charge amount from the photoelectric conversion element to generate image data; an IC memory; and the like.

The photographing direction specifying unit 36 has a function that specifies a direction (specifically, a photographing direction) of the terminal device 30 at a time of photographing. The function of the photographing direction specifying unit 36 can be achieved by, for example, a known acceleration sensor 36a and a gyro sensor 36b. The acceleration sensor 36a detects a change in moving speed of the terminal device 30. The gyro sensor 36b detects a change in inclination of the terminal device 30. On the basis of the information detected by the acceleration sensor 36a and the gyro sensor 36b, the terminal device 30 can specify the direction and the like at the time of photographing.

The display unit 37 displays the arithmetic result by the terminal control unit 31, and the like. The display unit 37 is a display device, such as a Liquid Crystal Display (LCD) and an Organic Electro Luminescence Display (OELD). The operating unit 38 has a function that accepts an operation input by the user to deliver its input signal to a CPU 311. An example of the operating unit 38 includes a touch panel, a keyboard, a computer mouse, and a numeric keypad. A touch panel display where the display unit 37 and the operating unit 38 are integrated may be employed. As the touch panel display, a touch panel display constituted by a known method, such as a capacitive method, an electromagnetic induction method, an infrared method, or a resistance film method, can be employed.

The management server 40 is connected to the base station 20 and the terminal device 30 through the Internet and manages the information uploaded from these devices. Specifically, the management server 40 obtains the information via the network communication unit 34 to execute a predetermined arithmetic with a server control unit 41, and stores the various information in a database 42. For example, the database of the management server 40 can store the sensing information (the biological information of the animal) obtained by the wireless tag 10, positional information and an action history of the wireless tag 10, and the positional information and an action history of the terminal device 30. The management server 40 may provide the terminal device 30 with the application program and can also provide the terminal device 30 with the tag table and the base station table (in which the positional information of the base station is stored).

Figure 3:
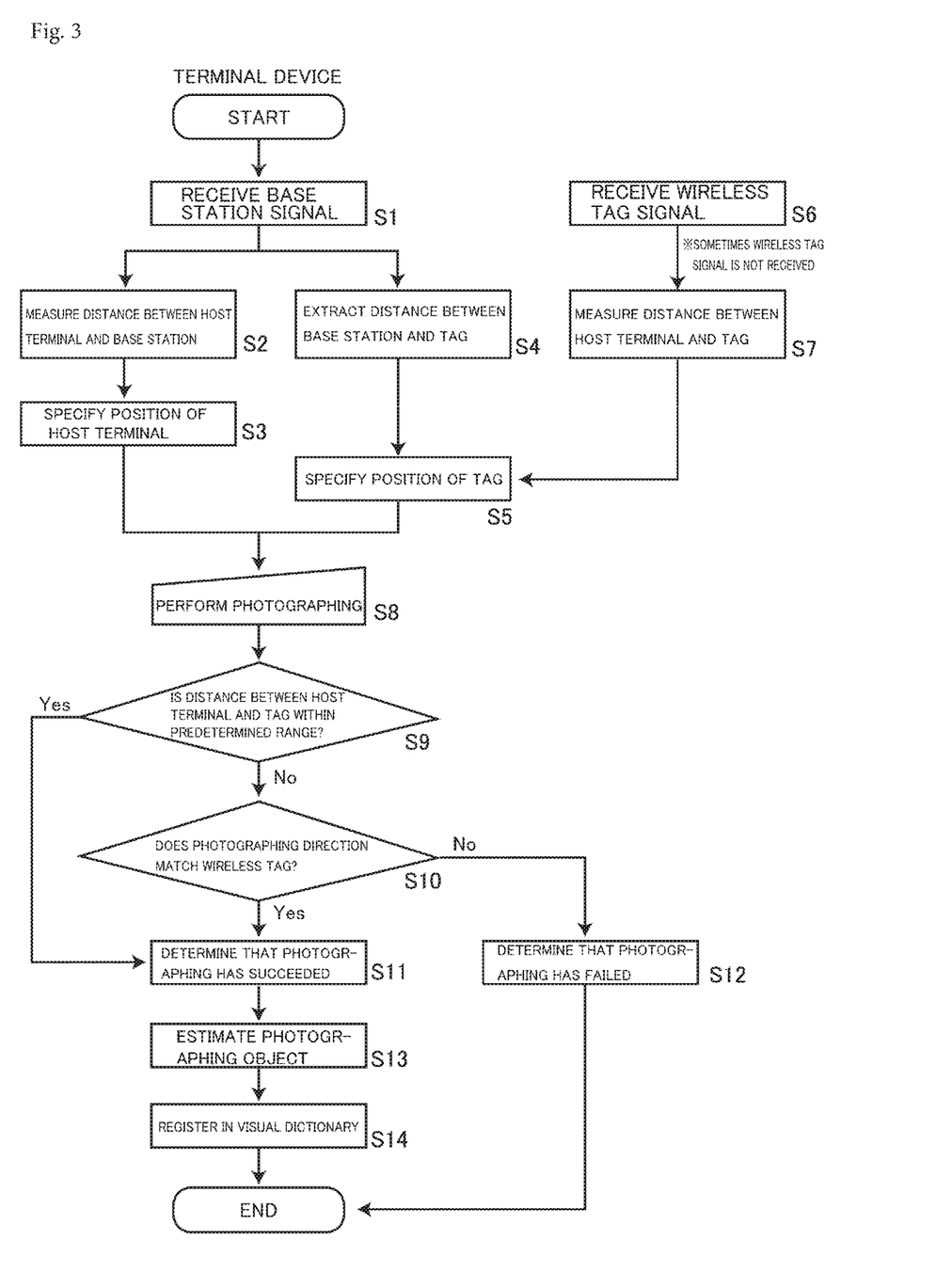
FIG. 3 is a flowchart illustrating a process that is performed by a terminal device.

Subsequently, with reference to FIG. 3 to FIG. 6, a flow of the process executed by the terminal device 30 is described. As illustrated in FIG. 2, the terminal control unit 31 of the terminal device 30 includes a between-base-station-distance measurement unit 31a, a host terminal position specifying unit 31b, a tag position specifying unit 31c, a between-tag-distance measurement unit 31d, and a photographing target estimator 31e, as function blocks. FIG. 3 is a flowchart illustrating the process that is performed by the respective function blocks, which are included in the terminal device 30.

As illustrated in FIG. 3, the terminal device 30 receives the wireless signals from the plurality of base stations 20 through the short-range wireless communication unit 33 (Step S1). The communication between the terminal device 30 and the base station 20 is executed through the short-range wireless communication, and thus the terminal device 30 receives the wireless signals from the plurality of base stations 20 positioned within a predetermined range (around a radius of 1 to 10 m).

The between-base-station-distance measurement unit 31a of the terminal device 30 measures the distances between the host terminal and the respective base stations 20 on the basis of the wireless signal received from the base station 20 (Step S2). The distance between the host terminal and the base station can be measured on the basis of, for example, the received intensity of the wireless signal emitted by the base station 20. That is, the stronger the received intensity of the wireless signal is, the nearer the distance between the host terminal and the base station is. The between-base-station-distance measurement unit 31a may execute an arithmetic of the distance from the base station on the basis of the received intensity of the wireless signal and may obtain the distance from the base station with reference to the table having a correspondence between the received intensity and the distance.

Figure 4:
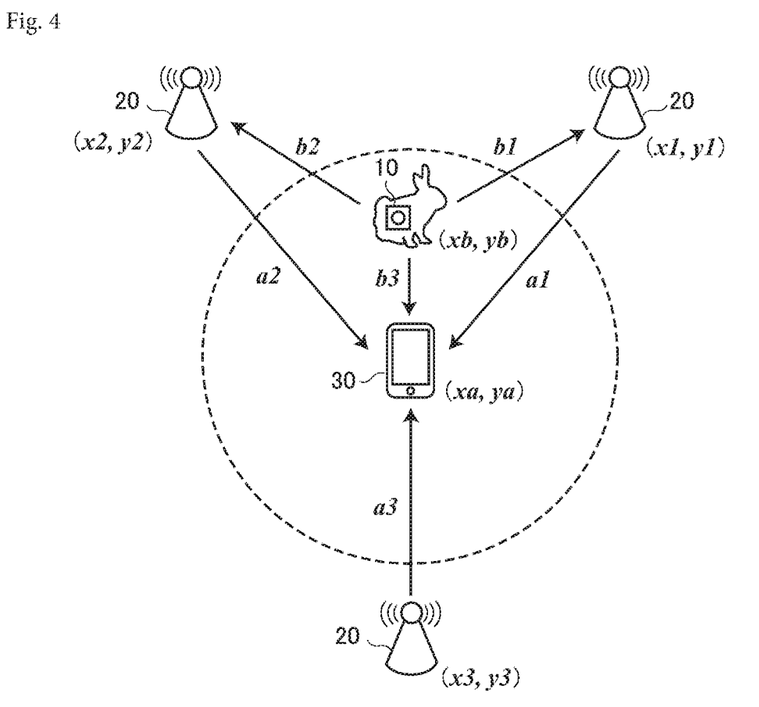
FIG. 4 illustrates an example of a method for measuring positions of the terminal device and a wireless tag.
Figure 5:
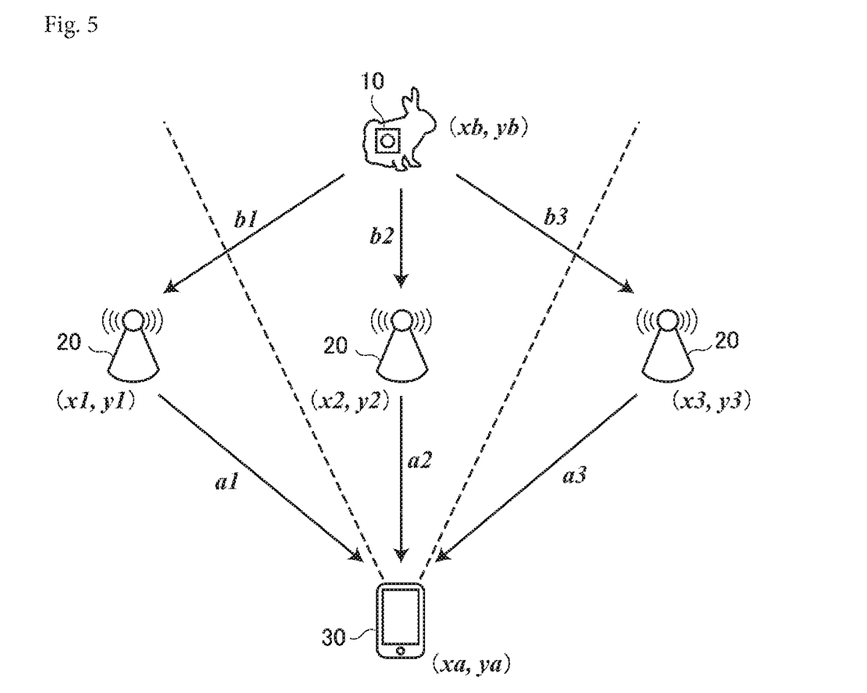
FIG. 5 illustrates another example of a method for measuring the positions of the terminal device and the wireless tag.

The host terminal position specifying unit 31b of the terminal device 30 specifies the position of the host terminal on the basis of the distances between the host terminal and the base stations, which have been obtained as described above (Step S3). An example of a method for specifying the position of the terminal device 30 is illustrated in FIG. 4 and FIG. 5. As illustrated in FIG. 4 and FIG. 5, x and y coordinates (x1, y1), (x2, y2), and (x3, y3) of three base stations 20 are already known, and distances a1, a2, and a3 between the respective base stations 20 and the terminal device 30 are measured by the between-base-station-distance measurement unit 31a of the terminal device 30. Then, the host terminal position specifying unit 31b of the terminal device 30 can obtain a coordinate (xa, ya) of the terminal device 30 on the basis of the x and y coordinates of the respective base stations 20, and the distances between the host terminal and the base stations, using the triangulation method. Thus, when the terminal device 30 is positioned to ensure receiving the wireless signals from at least the three base stations 20, the coordinate of this terminal device 30 can be specified.

The tag position specifying unit 31c of the terminal device 30 extracts the information pertaining to the distance between this base station 20 and the wireless tag 10, which is included in the wireless signal of the base station 20 (Step S4). That is, when the base station 20 receives the wireless signal from the wireless tag 10, the base station 20 measures the distance from this wireless tag 10 using the between-tag-distance measurement unit 21a and emits its distance information along with the wireless signal. Thus, when the communications with the base stations 20 succeed, the terminal device 30 can extract the information on the distances between the base stations and the tag from the wireless signals sent by the respective base stations 20.

After that, the tag position specifying unit 31c specifies the position of the wireless tag 10 on the basis of the information on the distances between the base stations and the tag, which has been obtained from the plurality of base stations 20, (Step S5). For example, as illustrated in FIG. 5, the x and y coordinates (x1, y1), (x2, y2), and (x3, y3) of the three base stations 20 are already known, and distances b1, b2, and b3 between the respective base stations 20 and the wireless tag 10 are measured by the between-tag-distance measurement unit 31a of the respective base station 20 to be transmitted from the base station 20 to the terminal device 30. Thus, the tag position specifying unit 31c of the terminal device 30 can obtain a coordinate (xb, yb) of the wireless tag 10 on the basis of the x and y coordinates of the respective base stations 20, and the distances between the base stations and the tag, using the triangulation method. Therefore, when the terminal device 30 is positioned to ensure receiving the wireless signals from at least the three base stations 20, and these three base stations 20 are positioned to ensure receiving the wireless signal from the same wireless tag 10, and even when the terminal device 30 and the wireless tag 10 do not directly communicate, the terminal device 30 can specify the coordinate of this wireless tag 10.

On the other hand, in some cases, the terminal device 30 and the wireless tag 10 can directly communicate (Step S6). The communication between the terminal device 30 and the wireless tag 10 is executed through the short-range wireless communication, and the terminal device 30 receives the wireless signal from the wireless tag 10 positioned within the predetermined range (around a radius of 1 to 10 m). In this case, the between-tag-distance measurement unit 31d of the terminal device 30 measures the distance between the host terminal and the wireless tag 10 on the basis of the wireless signal received from the wireless tag 10 (Step S7). The distance between the host terminal and the tag can be measured on the basis of, for example, the received intensity of the wireless signal emitted by the wireless tag 10. That is, the stronger the received intensity of the wireless signal is, the nearer the distance between the host terminal and the wireless tag 10 is. The between-tag-distance measurement unit 31d may execute an arithmetic of the distance from the wireless tag 10 on the basis of the received intensity of the wireless signal and may obtain the distance from the wireless tag 10 with reference to the table having a correspondence between the received intensity and the distance.

When the measurement of the distance between the host terminal and the tag succeeds, the tag position specifying unit 31c of the terminal device 30 can also specify the position of the wireless tag 10 using the distance between the host terminal and the tag (Step S5). For example, as illustrated in FIG. 4, the x and y coordinates (x1, y1), and (x2, y2) of the two base stations 20 are already known, and further, the distances b1 and b2 between the base stations 20 and the wireless tag 10 are measured by these two base stations 20 to be transmitted to the terminal device 30. The x and y coordinate (xa, xb) of the terminal device 30 has been already specified at Step S3, and also the distance b3 between the terminal device 30 and the wireless tag 10 has been already measured at Step S7. Thus, the tag position specifying unit 31c of the terminal device 30 can obtain the coordinate (xb, yb) of the wireless tag 10 on the basis of: the x and y coordinates (x1, y1), (x2, y2) of the two base stations 20; the x and y coordinate (xa, xb) of the host terminal; the distances b1 and b2 between the two base stations and the tag; and the distance b3 between the host terminal and the tag, using the triangulation method. Therefore, even in a state where the wireless tag 10 can communicate with only the two base stations 20, when this wireless tag 10 and the terminal device 30 are directly communicable, the terminal device 30 can specify the coordinate of this wireless tag 10.

Through the above-described steps, the terminal device 30 obtains the positional information of the host terminal and the positional information of the wireless tag 10. The positional information of the host terminal and the wireless tag 10, which has been obtained as described above, may be displayed on the display unit 37. For example, displaying the terminal device 30 and the wireless tag 10 on a map image facilitates knowing the positional relationship between the terminal device 30 and the wireless tag 10 by the user. Along with the positional information of the wireless tag 10, information pertaining to the object (for example, an animal) to which this wireless tag 10 is mounted, such as a type, a name, and an icon image of the object, can also be displayed. Further, on the terminal device 30, the distance and a direction to the wireless tag 10 may be displayed.

Subsequently, as an example of the embodiment of the present invention, an example where the system of the present invention is applied to a recreation where the object (animal) is photographed to register its image in a visual dictionary is described in detail.

As illustrated in FIG. 3, it is assumed that after the position of the terminal device 30 and the position of the wireless tag 10 are specified, photographing is performed by the photographing unit 35, which is included in the terminal device 30, (Step S8). In this case, the photographing triggers determining whether the distance between the host terminal and the wireless tag 10 is within the predetermined range by the photographing target estimator 31e of the terminal device 30 (Step S9). As described before, the coordinate (xa, ya) of the terminal device 30 and the coordinate (xb, yb) of the wireless tag 10 have been already specified, and thus the distance between both can be obtained on the basis of these coordinates. Further, in the case of a state where the terminal device 30 and the wireless tag 10 are directly communicable, the distance between the terminal device 30 and the wireless tag 10 can be measured on the basis of the received intensity of the wireless signal of the wireless tag 10. Here, the predetermined range can be appropriately adjusted and may be, for example, around 1 m to 5 m.

As illustrated in, for example, FIG. 4, when the photographing target estimator 31e of the terminal device 30 determines that the distance between the host terminal and the wireless tag 10 is within the predetermined range, it is determined that photographing this wireless tag 10 has succeeded (Step S11). On the other hand, when it is determined that the distance between the host terminal and the wireless tag 10 is not within the predetermined range, the photographing target estimator 31e determines whether the photographing direction of the photographing unit 35 matches an existence direction of the wireless tag 10 or not (Step S10). As described before, the coordinate (xa, ya) of the terminal device 30 and the coordinate (xb, yb) of the wireless tag 10 have been already specified, and thus the positional relationship between both can be obtained on the basis of these coordinates. Therefore, it can be determined to match/not to match the photographing direction and the existence direction of the wireless tag 10. Considering an angle of view of the photographing unit 35, it is only necessary that the photographing direction is determined from whether the wireless tag 10 exists within a range of this angle of view.

As illustrated in, for example, FIG. 5, even when the distance between the host terminal and the wireless tag 10 is not within the predetermined range, and when this photographing direction is determined to match the existence direction of the wireless tag 10, the photographing target estimator 31e of the terminal device 30 determines that the photographing of the wireless tag 10 has succeeded (Step S11). On the other hand, when the distance between the host terminal and the wireless tag 10 is not within the predetermined range, and the photographing direction does not match the wireless tag 10, it is determined that the photographing has failed (Step S12).

The example illustrated in FIG. 3 includes an OR condition where it is determined that "the photographing has succeeded" when either "the distance between the terminal device and the wireless tag" or "the photographing direction" is satisfied. Note that it may include an AND condition where it is determined that "the photographing has succeeded" only when both "the distance between the terminal device and the wireless tag" and "the photographing direction" are satisfied. That is, in the case of the AND condition, only when the distance between the terminal device 30 and the wireless tag 10 is within the predetermined range, and this photographing direction matches the existence direction of the wireless tag 10, it is determined that the photographing of this wireless tag 10 has succeeded. A choice of any of the OR condition and the AND condition is simply selected considering a characteristic of the photographing target and a difficulty level of the recreation. For example, when the photographing target is a small animal positioned such that the user can touch it, the AND condition is preferred. It is only necessary that the OR condition is employed when the photographing target is a distantly positioned animal, such as a bird. Regarding the difficulty level of the recreation, typically, the OR condition is easy, and the AND condition is difficult.

Subsequently, using, for example, the ID information of the wireless tag 10 where it is determined that the photographing has succeeded, the photographing target estimator 31e estimates a type of this object (Step S13). That is, the tag table of the storage unit 32 of the terminal device 30 with which the tag ID of the wireless tag 10 is associated stores information pertaining to a type of the object to which it is mounted, and the like. Therefore, taking the tag ID as a key, searching the tag table can specify the type of the object.

Performing the process of Step S9 to Step S13 can facilitate estimating the photographing target. That is, while accurately specifying a photographing target requires advanced image processing, such as analyzing the photographed image to extract the object included in this image, the present invention ensures estimating the photographing target with a certain degree of accuracy even when such image processing is not executed. Further, advanced image processing is not required, and thus the photographing target can be immediately estimated after the photographing. Note that the present invention does not eliminate the image processing where the photographed image is analyzed to specify the photographing target, and such image processing may be executed. In this case, after Step S13, the image processing can be executed to validate whether the photographing target, which has been estimated at Step S13, is correct or not.

Figure 6:
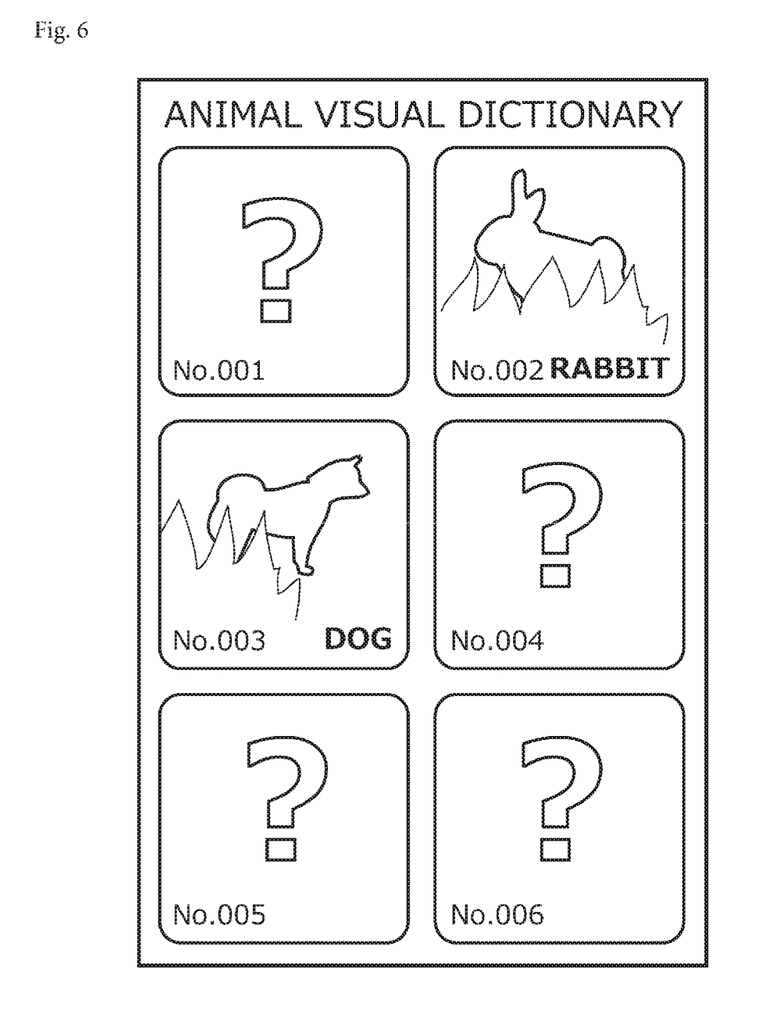
FIG. 6 illustrates an example of a digital animal visual dictionary.

Subsequently, the terminal control unit 31 of the terminal device 30 associates the photographed image, which has been photographed at Step S8, with the type of the target, which has been specified at Step S13, and saves it in the storage unit 32 (Step S14). Specifically, in the storage unit 32, a storage space to save the photographed image is provided, and the photographed image is preferably saved in the storage unit 32 in a visual dictionary format. For example, FIG. 6 illustrates an example of a visual dictionary to save a photographed image. As illustrated in FIG. 6, the storage space for a visual dictionary is configured to record a photographed image of an object (animal) classified in accordance with a type of the object. For example, a storage area for No. 002 is configured to record a photographed image for rabbit, and a storage area for No. 003 is configured to record a photographed image for dog. Thus, at Step S13, when the photographing target is estimated to be a rabbit, this photographed image is saved in the storage area for No. 002 (storage area for rabbit). Thus, when a photographed image can be saved in the visual dictionary format, this ensures providing the user who owns the terminal device 30 with a recreation where while an animal is observed, its photographed image is collected. Therefore, even when the photographed image of the terminal device 30 is not analyzed, the system of the present invention ensures specifying the type of the target included in this photographed image and saving the photographed image in the visual dictionary format.

As described above, in order to express the content of the present invention, the description of the application has described the embodiment of the present invention by referring to the drawings. Note that, the present invention is not limited to the above-described embodiment and encompasses a changed configuration and an improved configuration that are obvious for those skilled in the art on the basis of the matters described in the description of the application.

INDUSTRIAL APPLICABILITY

The present invention relates to a terminal device that can obtain a positional relationship with a wireless tag. The present invention can be used in various situations, such as observing an animal, finding a lost property, avoiding a traffic accident. Further, the present invention is not limited to these utilization configurations and is applicable to various goods and services.

DESCRIPTION OF REFERENCE SIGNS

10 Wireless tag
11 Emitting unit
12 IC chip
13 Heartbeat sensor
14 Body temperature sensor
15 Acceleration sensor
20 Base station
21 Base station control unit
21a Between-tag-distance measurement unit
22 Storage unit
23 Short-range wireless communication
24 Network communication unit
30 Terminal device
31 Terminal control unit
31a Between-base-station-distance measurement unit
31b Host terminal position specifying unit
31c Tag position specifying unit
31d Between-tag-distance specifying unit
31e Photographing target estimator
32 Storage unit
33 Short-range wireless communication unit
34 Network communication unit
35 Photographing unit
36 Photographing direction specifying unit
36a Acceleration sensor
36b Gyro sensor
37 Display unit
38 Operating unit
40 Management server
41 Server control unit
42 Database
43 Network communication unit
100 Position measurement system

The invention claimed is:
1. A terminal device that obtains a positional relationship between a wireless tag and a host terminal, the terminal device comprising:
 a between-base-station-distance measurement unit that measures a first distance between a plurality of base stations provided at individual reference positions and the host terminal on the basis of wireless signals emitted by the base stations;
 a host terminal position specifying unit that specifies a position of the host terminal on the basis of the first distance; and
 a tag position specifying unit that specifies a position of the wireless tag on the basis of at least information pertaining to a second distance between the base stations and the wireless tag, the information being transmitted by the base stations that have received a wireless signal emitted by the wireless tag;
 wherein
 the wireless signal emitted by the wireless tag includes identification information unique to an object to which the wireless tag is mounted, and
 the terminal device further includes:
  a photographing unit;
  a photographing direction specifying unit that specifies a photographing direction by the photographing unit; and
  a photographing target estimator that estimates that photographing of the object to which the wireless tag is mounted has succeeded when the photographing direction by the photographing unit matches an existence direction of the wireless tag.
2. The terminal device according to claim 1, further comprising a between-tag-distance measurement unit that measures a third distance between the wireless tag and the host terminal on the basis of the wireless signal emitted by the wireless tag, wherein
the tag position specifying unit specifies the position of the wireless tag on the basis of the second distance and the third distance.

3. The terminal device according to claim 1, wherein
the wireless signal emitted by the wireless tag includes identification information unique to an object to which the wireless tag is mounted, and
the terminal device further includes:
  a photographing unit; and
  a photographing target estimator that estimates that photographing of the object to which the wireless tag is mounted has succeeded when the terminal device is within a predetermined distance range from the wireless tag at a time of photographing by the photographing unit.

4. A non-transitory computer readable medium that contains instructions that when executed by a processor causes a portable information terminal to function as the terminal device according to claim 1.

5. A system comprising:
a terminal device;
a wireless tag; and
a plurality of base stations provided at individual reference positions, wherein the base station measures a second distance between the wireless tag and a host base station on the basis of a wireless signal emitted by the wireless tag,
the base station transmits information pertaining to the second distance to the terminal device,
the terminal device measures a first distance between the base stations and a host terminal on the basis of wireless signals emitted by the base stations,
the terminal device specifies a position of the host terminal on the basis of the first distance, and
the terminal device specifies a position of the wireless tag on the basis of at least information pertaining to the second distance;
wherein
the wireless signal emitted by the wireless tag includes identification information unique to an object to which the wireless tag is mounted, and
the terminal device further includes:
  a photographing unit;
  a photographing direction specifying unit that specifies a photographing direction by the photographing unit; and
  a photographing target estimator that estimates that photographing of the object to which the wireless tag is mounted has succeeded when the photographing direction by the photographing unit matches an existence direction of the wireless tag.

* * * * *